(12) United States Patent
Romeu Guardia

(10) Patent No.: US 6,581,756 B2
(45) Date of Patent: Jun. 24, 2003

(54) FODDER DISTRIBUTION CONVEYORS

(75) Inventor: Gener Romeu Guardia, Agramunt (ES)

(73) Assignee: Rotecna S.A., Agramunt (ES)

( * ) Notice: Subject to any disclaimer, the term of this patent is extended or adjusted under 35 U.S.C. 154(b) by 0 days.

(21) Appl. No.: 09/902,585

(22) Filed: Jul. 12, 2001

(65) Prior Publication Data

US 2002/0014393 A1 Feb. 7, 2002

(30) Foreign Application Priority Data

Jul. 26, 2000 (ES) ............................................ 20001869

(51) Int. Cl.[7] .............................................. B65G 23/00
(52) U.S. Cl. ...................... 198/832; 474/163; 198/716
(58) Field of Search .............................. 474/162, 163; 198/832, 834, 716, 729, 733

(56) References Cited

U.S. PATENT DOCUMENTS

| | | | | |
|---|---|---|---|---|
| 1,704,150 A | * | 3/1929 | Riley ........................ | 198/834 |
| 3,899,219 A | * | 8/1975 | Boggs ........................ | 305/115 |
| 4,308,019 A | * | 12/1981 | Horkey et al. .............. | 198/834 |
| 4,752,281 A | * | 6/1988 | Lammers .................... | 474/161 |
| 5,067,931 A | * | 11/1991 | Nagamatsu et al. ......... | 474/162 |
| 5,203,861 A | * | 4/1993 | Irwin et al. ................. | 474/161 |

* cited by examiner

Primary Examiner—Christopher P. Ellis
Assistant Examiner—Richard Ridley
(74) Attorney, Agent, or Firm—Sughrue Mion, PLLC

(57) ABSTRACT

"Improvements in fodder distribution conveyors, of the type which have an endless cable or chain with a plurality of transverse dragging means and which move along a conduit, with outlets for the unloading of corresponding portions of fodder into respective conduits and the cable or chain being moved by a driving motor provided with peripheral toothing, between whose teeth the transverse dragging means engages; characterized in that the driving wheel is made up of a disk joined to a motor means and a series of replaceable, peripheral teeth; each tooth is composed of two parts with an upper longitudinal axis channel; and, preferably, each tooth is mounted in a tilting fashion and in its interior has an elastic means, and each tooth has a conical face and another flat".

6 Claims, 4 Drawing Sheets

FODDER DISTRIBUTION CONVEYORS

TECHNICAL SECTOR OF THE INVENTION

The present invention refers to some improvements in fodder distribution conveyors, which can be used in a great variety of farms with stabled animals, in order to automate the distribution of food.

BACKGROUND TO THE INVENTION

Fodder distribution conveyors, which in general are equipped with an endless cable, or endless chain, are already known. Both the chain and the cable have a plurality of transverse dragging means, also called disks or scrapers, which move along a channel or a pipe, with outlets for the unloading of a portion of fodder into other pipes, or similar, which carry the respective fodder portions to a respective device for their sharing-out into cells, or else the unloading is carried out directly in the latter. These fodder unloading areas to the corresponding cell, are called receiving stations.

In the known conveyors, the chain or the cable, with their transverse dragging means, move according to a closed path which extends from a fodder entry station and passes by the receiving stations in which the product is unloaded through the pipe outlets, or, where appropriate, the channel. The movement of the cable or chain is obtained by means of a driving wheel.

Furthermore, the type of driving wheel equipped with a single-piece peripheral toothing, between whose teeth engage the disks fixed to the cable or chain as the wheel turns.

In the known conveyors of the described type, there is a drawback in the lack of constancy of the effective pitch of the disks, or, in other words, of the distance or separation between each pair, due to both the wearing of the disks on their rear sides against which the driving pulley's teeth act and because of the stretching of the cable or chain itself, particularly when its development is relatively large (which happens in medium-large or large systems).

In the European patent N° 82802980, publication N° 89362 by Dahl and Dall, known conveyors at their deposit date are described, basically coinciding with what has been described herein, the characteristic of the object of said patent being that the driving pulley of such conveyors is circumferentially smooth and has an external configuration, in transverse cross-section, determining a friction coupling between the pulley and the portions of the corresponding disks which couple to the pulley periphery, there being means for tensing the cable or the chain around the driving pulley. As another feature, it is also envisaged that the driving pulley is formed with a hollow (in the form of a channel) in order to receive approximately one half of each disk and to couple the disks by friction in portions being almost diametrically opposite in each one.

Nevertheless, the solution proposed in the quoted European patent suffers from the drawback of the wearing out of the peripheral areas of the pulley which come into contact with the disks and from a relatively strict or critical adjustment of the tolerance between said peripheral areas and the disks in order to ensure enough friction during the movement of the cable or the chain and their disks, which avoids their slipping with respect to the driving pulley.

SUMMARY OF THE INVENTION

Fodder distribution conveyors equipped with the improvements object of the invention, are of the type which have an endless cable or chain, with a plurality of transverse dragging means and which move along a conduit, with outlets for the unloading of corresponding portions of fodder, the cable or chain moving, thanks to a driving wheel provided with a peripheral toothing, between whose teeth the transverse dragging means engages.

These improvements are characterized in that the driving wheel is made up of a disk joined to a driving means and by a series of replaceable teeth, mounted around its periphery; and in that each tooth is made up of two parts determining an upper longitudinal axis channel solely for the passage of the cable or the chain.

They are also characterized in that each tooth is mounted in a tilting fashion on the driving wheel disk and in that in its interior it has an elastic means.

Likewise, they are characterized in that each tooth has a conical face and another flat, against one of which the respective transverse dragging means of the rear face, conical or flat, can abut.

The improvements in the fodder distribution conveyors according to the invention contribute, among others, the following advantages with respect to the prior art:

a) The teeth are replaceable unitarily, with the resulting saving with respect to known toothed wheels, which are of a single-piece and must be completely substituted in the case of one or more of the teeth being damaged.

b) In order to adapt a driving wheel according to the invention to the needs of each case, the necessary teeth will be fitted onto a disk of a specific diameter. Substituting the disk of a given driving wheel for another of a convenient diameter, a specific driving wheel can also be adjusted to the variations that may occur during the life of a specific installation in order to maintain the optimum operating conditions.

c) The manufacture of the driving wheel according to the invention is facilitated, in that, being made up of a disk or similar with replaceable teeth, its obtainment is independent for each of the two basic components, for which the disk can be obtained from a metallic material, for example, making a great diversity of shapes and colours possible. In addition, both the disk and the teeth can be of the same or different plastic material and the same or different colours. Moreover, as it can be obtained in relatively significant quantities and with light but resistant materials, it is all at a relatively low cost.

d) Each tooth will be able to be fitted onto the wheel in a tilting and preferably, elastic fashion, which makes it possible to continue transmitting the necessary effort to the cable and chain disks for their movement throughout the installation. Thus, the elongation of said cable or chain is compensated for and the wearing of the disks' rear sides, apart from providing a cushioning effect against possible negative strains and maintaining a certain mechanical tension to the cable or to the chain.

e) The teeth will be able to work on one or other of the two sides, for the purpose of which one shall be rounded, and the other flat for a line with disks with at least its rear side flat. In each of the two cases all of the wheel's teeth will be arranged, in the same position of course, passing from one position to another just by fitting the teeth in the required direction. As a result of all this the driving wheel has great versatility as it can be applied to the types of disk lines described, currently existing in the market.

The improvements in the fodder distribution conveyors, object of the invention, offer the previously described advantages, as well as others which will be easily deduced from the embodiment example of the same described below, in order to help in understanding the features shown earlier and, at the same time, disclosing several details of the same, for the purpose of which some drawings are enclosed only by way of non limiting example of the scope of the invention, a practical example object of the same being shown therein.

BRIEF DESCRIPTION OF THE DRAWINGS

Finally.

DESCRIPTION OF AN EMBODIMENT ACCORDING TO THE INVENTION

Figure 1:
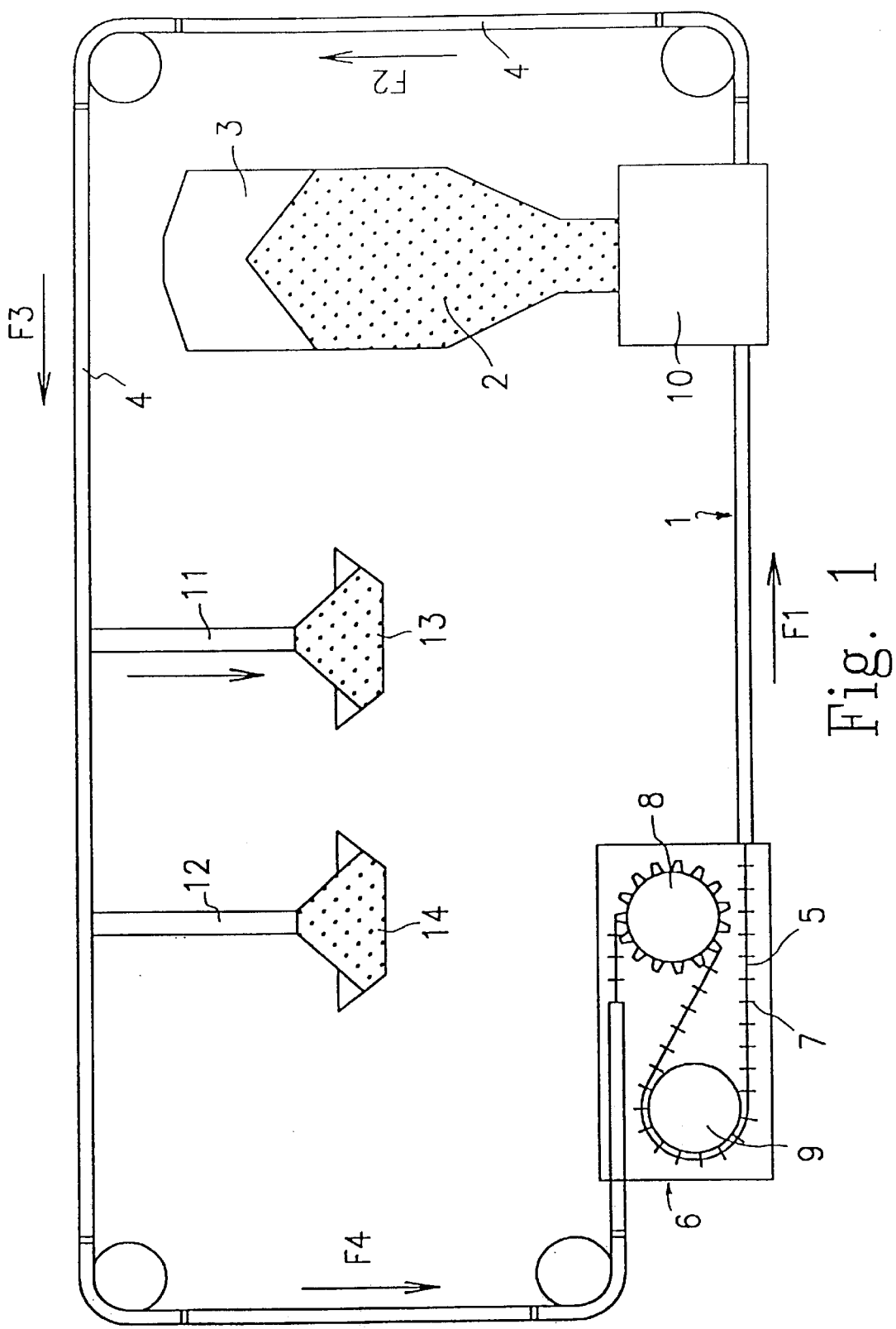
FIG. 1 shows a diagrammatic elevation view of a fodder distribution conveyor installed on a farm of stabled animals, such as pigs, for example.

In accordance with the drawings, the installation shown diagrammatically in FIG. 1 is conventional and corresponds to a farm of stabled animals. It is composed of a conveyor marked, in general, by -1-, for the distribution of fodder -2-, stored in the deposit -3-, the conveyor showing a pipe -4- within which the collection, movement and distribution is carried out. The arrows -F1 to F4- show the direction of the endless cable's circuit along the pipe interior.

The conveyor comprises a drive unit -6- of the cable 5 provided with transverse disks -7-, equidistant and fixed to the same. Unit -6- is composed of a driving wheel -8-, toothed on its periphery and joined by its shaft to an electromotor with a reducer (not shown), and there must be a practical similarity between the pitch of the teeth of wheel -8- and the pitch of the disks -7- of cable -5- in order to ensure that the latter insert properly into the teeth, in other words, so that they abut on their rear face onto the front face of the teeth.

Unit -6- also comprises another wheel -9- which performs a tensile function in order to achieve a certain mechanical tension in cable -5-, which, in practice, can be regulated and this unit is normally situated in a protective box.

Once the conveyor is running, cable -5-, with its disks -7-, moves along the inside of the pipe, passes a box -10-, in which the lower end of the deposit -3- ends, in such a way that the fodder -2- stored inside of it, is collected through the spaces existing between each pair of disks circulating through this part of the installation. For this, the pipe -4- is provided with an opening in this part of the circuit or simply halts at the same.

The fodder portions are transported until they pass above the pipes -11- and -12- as will be explained later (obviously the pipes will be much greater in number in practice, only two have been shown to facilitate understanding and the drawing). There are some lower outlets in pipe -4- in order to make possible the unloading of corresponding fodder portions to the interior of the pipes -11- and -12-. These pipes (variable in number according to the allocation) lead into respective deposits of troughs -13- and -14- which are to be found in each compartment or cell with animals for their feeding, including a drinking trough. The fodder unloading areas constitute what was previously called fodder receiving stations.

When the deposit of the trough -13- has been filled fodder accumulates in pipe -11- until the latter also fills and then the conveyor unloads fodder into the following pipe -12- and the process is repeated. Likewise and successively in the following receiving stations (not shown) until the last one fills and the conveyor stops thanks to a detecting means situated in this final one.

In other fodder distribution conveyor systems the cable with its transverse disks is substituted by a chain which also has transverse disks. In practice disks are the preferred configuration although other configurations are used for these transverse dragging means.

In practice, the fodder distribution conveyor is suitably developed for the system in which it is located. So, for example, it is arranged zigzag, covering the feeding trays/troughs that it has to feed during its enclosed course.

Figure 2:
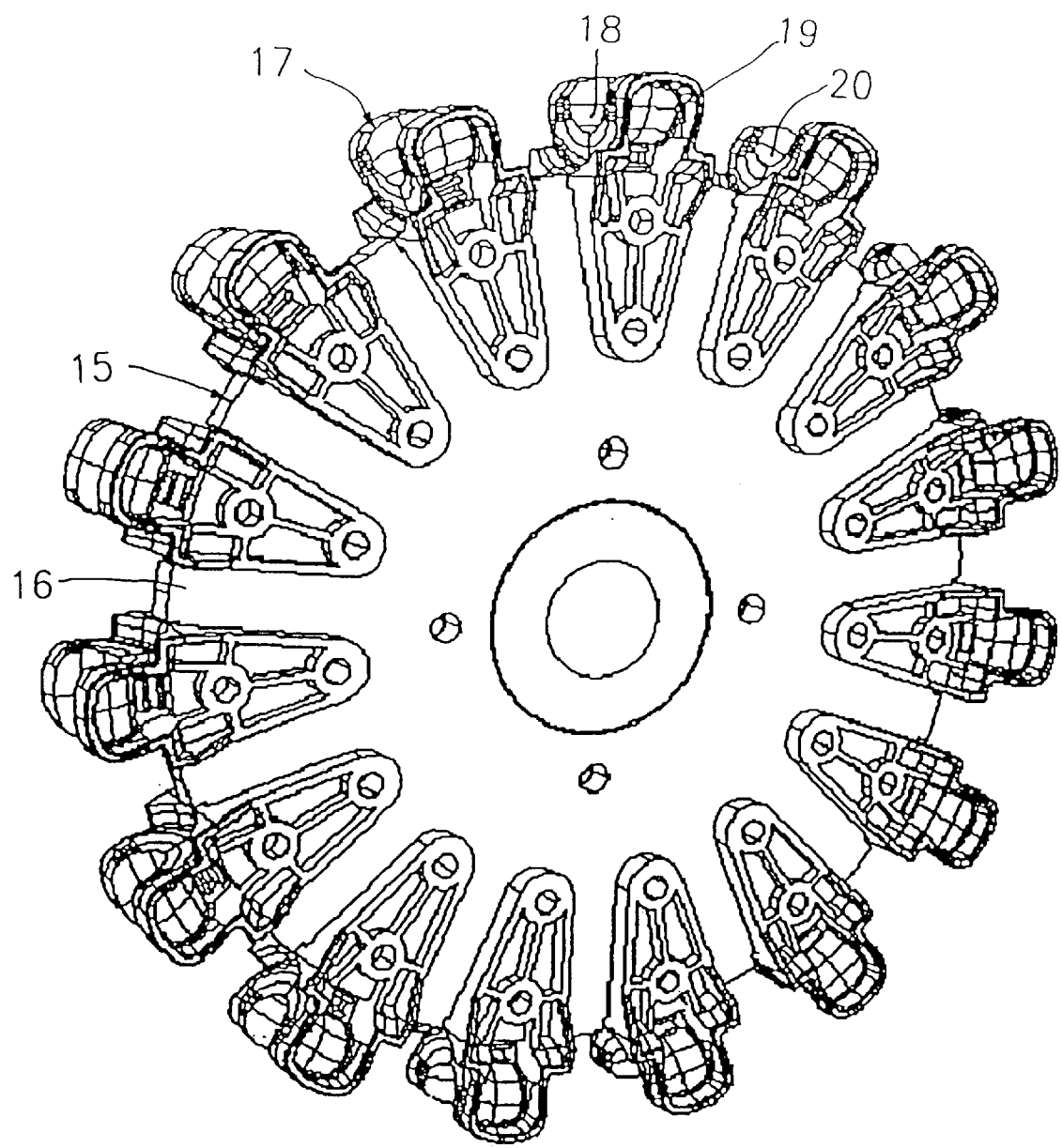
FIG. 2 corresponds to a perspective view of a driving wheel according to the invention and provided with 15 teeth.
Figure 5:
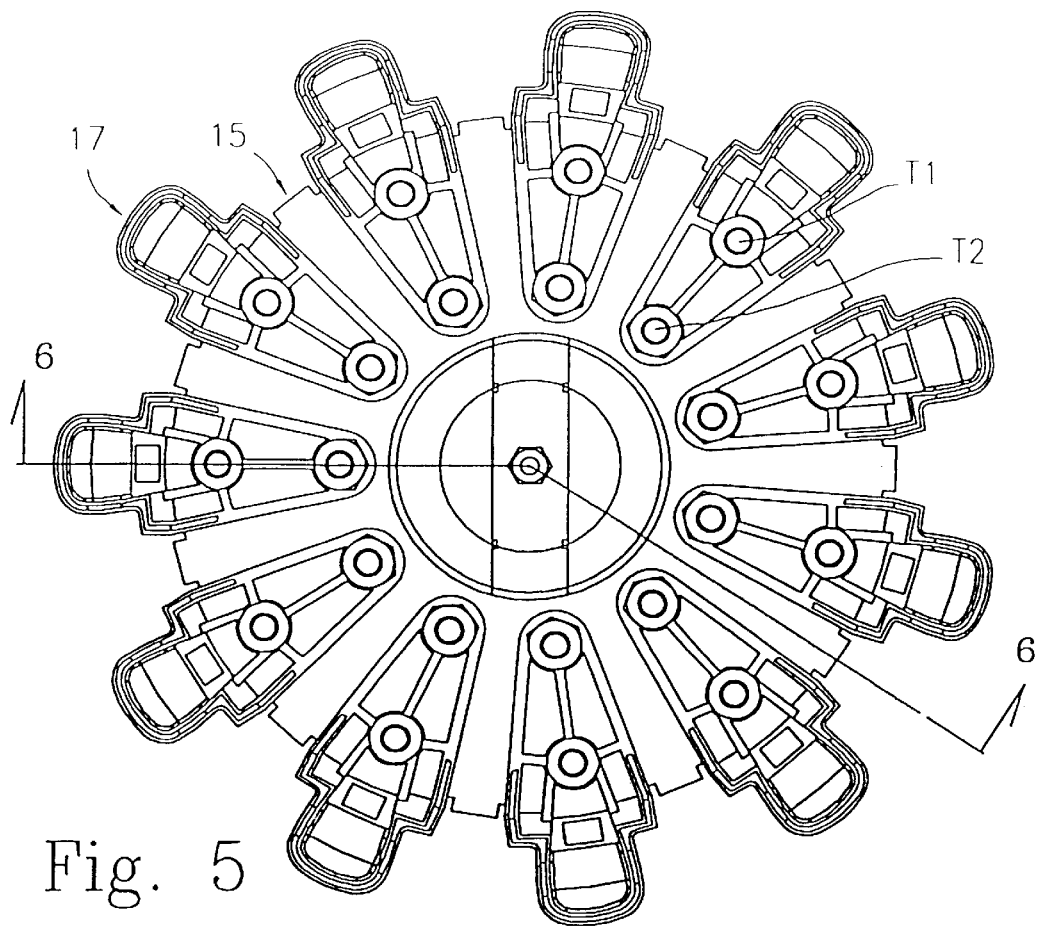
FIG. 5 is an elevation view of a driving wheel according to the invention provided with 11 teeth.
Figure 6:
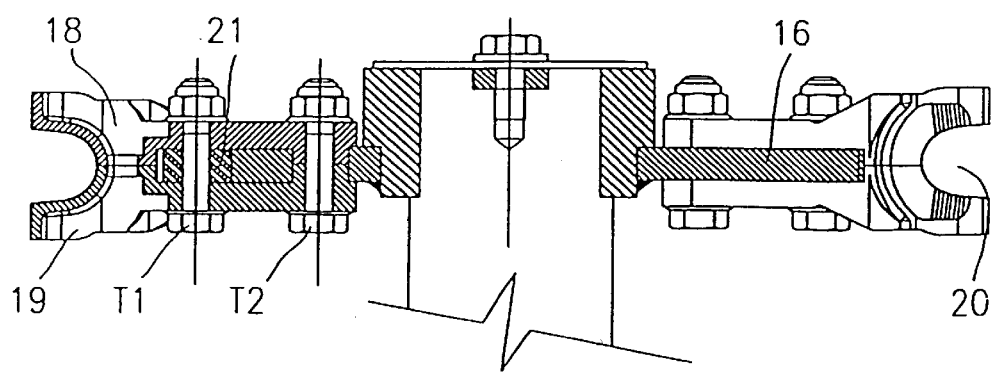
FIG. 6 is a section view according to 6—6 of FIG. 5.

According to the invention, the improvements in the fodder distribution conveyors of the type described present (FIG. 2) a driving wheel -15- made up of a disk -16-, which is joined to a motor, where appropriate, with a reducer (not shown). Around the periphery of the disk teeth -17- are fitted, each being fitted to the disk by means of two screws -T1- and -T2- (FIGS. 5 and 6), so that they are detachable and replaceable. Each tooth is made up of two parts -18- and -19- (FIGS. 2, 3, 4 and 6) which are joined to each other and are fixed to the disk as shown, determining a channel -20- (FIGS. 2 and 6) at its free end, permitting the passage of cable -5- or the chain, but not of transverse disks -7-. The channel is situated according to a longitudinal geometric shaft, in other words, like a circumference situated on a perpendicular plane to the motor shaft to which the disk is fitted.

In a preferred embodiment, teeth -17- are fitted tilting onto the disk -15- of the driving wheel by means of, for example, a dimensioned and/or configuration of the end holes with the screws -T1- in the teeth, which facilitates its tilting and screw -T2- working as a turning shaft. In this case it is deemed convenient to endow the inside of each tooth with an elastic means -21- (FIG. 6) acting, to a certain degree, as a cushion and tensor. The elastic means is situated in a specific space between the two parts -18- and -19- of each tooth (FIGS. 3 and 4) being joined to each other and is partly delimited by two projections -22- and -23- and by two sleeves -24- and -25- (these show each orifice for the passage of a screw -T2-, whilst the holes -26- and -27- allow the passing of a screw -T1-).

Figure 4:
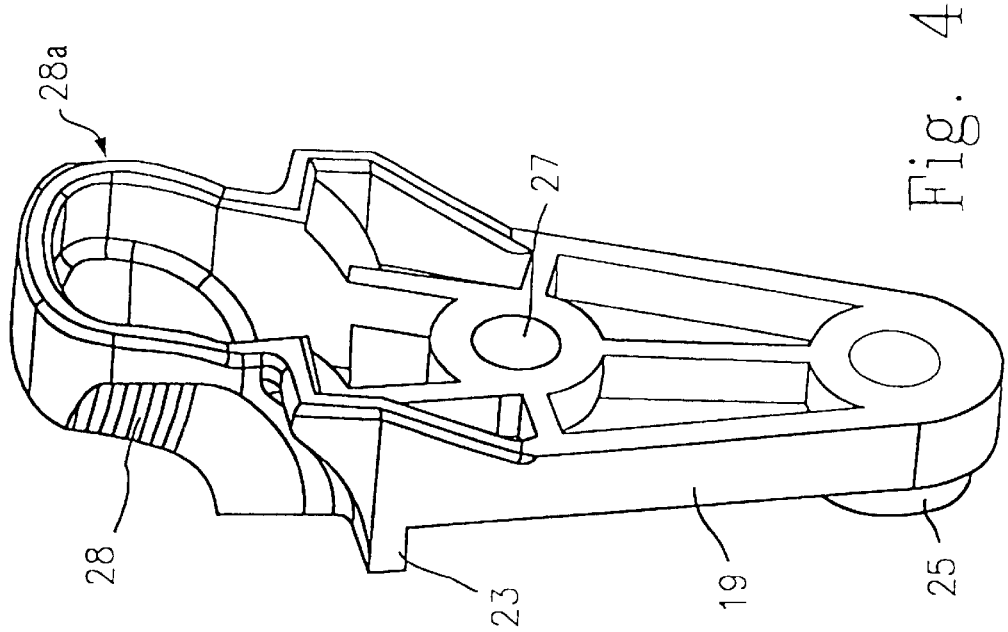
FIGS. 3 and 4 show the two parts which, once juxtaposed and joined to each other and to the disk, make up one of the teeth which, in a suitable number, form part of the driving wheel.
Figure 3:
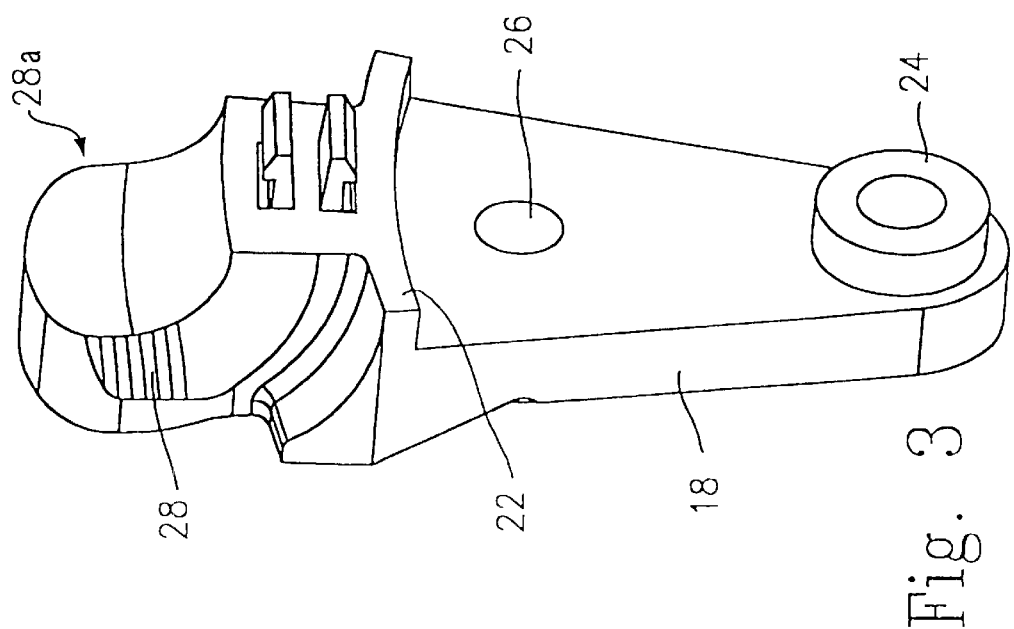

Moreover, each tooth will have a rounded face -28- and another flat face -28a- (FIGS. 3 and 4). Thus, it will be possible to apply the driving wheel -15- to conveyors provided with rear faced rounded or flat disks, which will couple suitably to the driving wheel just by fitting them onto one or the other of the two possible directions of its assembly.

It must be pointed out that, it will be possible to apply, in the embodiment of the improvements object of the present invention, all the variations in detail which experience and practice deem advisable with regard to shapes and dimensions, whether absolute or relative, materials employed and other circumstances of a supplementary nature, as well as introducing as many constructive modifications of detail which are compatible with the essence of that claimed, all of which is comprised within the spirit of the following claims.

What is claimed is:

1. Improvements in fodder distribution conveyors, of the type which have endless cable or chain, with a plurality of transverse dragging means and which move along a conduit which has corresponding outlets for the unloading of corresponding portions of fodder into respective conduits which drive them towards a farm's cell, the cable or chain being moved with their transverse dragging means by a driving wheel provided with peripheral toothing, between whose teeth the transverse dragging means engages;

wherein the driving wheel comprises:

a driving wheel disk joined to a motor means, and a series of replaceable teeth, mounted around the driving wheel disk's periphery;

wherein each tooth is composed of two parts that form an upper longitudinal axis channel solely for the passing of the cable or chain.

2. The improvements in fodder distribution conveyors according to claim 1, wherein each tooth is mounted in a tilting fashion on the driving wheel disk and each tooth, in its interior, has an elastic means.

3. The improvements in fodder distribution conveyors, according to claim 1, wherein each tooth has a rounded face and a flat face opposing the rounded face, wherein each tooth is capable of being reversed so that the positions of the rounded face and flat face of each tooth are reversed, and wherein when a rear face of the transverse dragging means is flat, the transverse dragging means can abut against the flat face of the teeth and when a rear face of the transverse dragging means is rounded, the transverse dragging means can abut against the rounded face of the teeth.

4. A driving wheel comprising:

a driving wheel disk joined to a motor means, and a series of replaceable teeth, mounted around the driving wheel disk's periphery;

wherein each tooth is composed of two parts that form an upper longitudinal axis channel solely for the passing of a cable or chain.

5. The driving wheel of claim 1, wherein each tooth is mounted in a tilting fashion on the driving wheel disk and each tooth, in its interior, has an elastic means.

6. The driving wheel of claim 1, wherein each tooth has a rounded face and a flat face opposing the rounded face, and wherein each tooth is capable of being reversed so that the positions of the rounded face and flat face of each tooth are reversed.

* * * * *